United States Patent [19]

Yamada

[11] Patent Number: 4,530,583
[45] Date of Patent: Jul. 23, 1985

[54] DISPLAY DEVICE FOR VIEW FINDER

[75] Inventor: Yasuyuki Yamada, Tokyo, Japan

[73] Assignee: Canon Kabushiki Kaisha, Tokyo, Japan

[21] Appl. No.: 471,720

[22] Filed: Mar. 3, 1983

Related U.S. Application Data

[63] Continuation of Ser. No. 279,221, Jun. 30, 1981, abandoned.

[30] Foreign Application Priority Data

Jul. 2, 1980 [JP] Japan .............................. 55-93767[U]

[51] Int. Cl.³ ...................... G03B 13/08; G03B 17/20
[52] U.S. Cl. .................................. 354/224; 354/289.1
[58] Field of Search ............ 354/219, 224, 225, 289.1, 354/289.11, 289.12, 155, 465, 471–475

[56] References Cited

U.S. PATENT DOCUMENTS 4,217,044 8/1980 Yamazaki et al. .................. 354/474

FOREIGN PATENT DOCUMENTS 55-28088 2/1980 Japan ...................................... 354/54

Primary Examiner—John Gonzales
Attorney, Agent, or Firm—Toren, McGeady, Stanger, Goldberg & Kiel

[57] ABSTRACT

A display device in a view finder of a camera includes an illumination light source for illuminating the display portion and an illumination light leading body. The body has a reflecting surface and two permeable surfaces having such a refracting force such that the light emitting portion of the illumination light source is almost conjugate with the position of the pupil while observing the image in the view finder. The apparatus is arranged in such a manner that the illumination light beam is incident upon the one permeable surface of the illumination light leading body and goes out at the other permeable surface so as to illuminate the display portion. Accordingly, the display portion is observed together with the image in the view finder.

1 Claim, 5 Drawing Figures

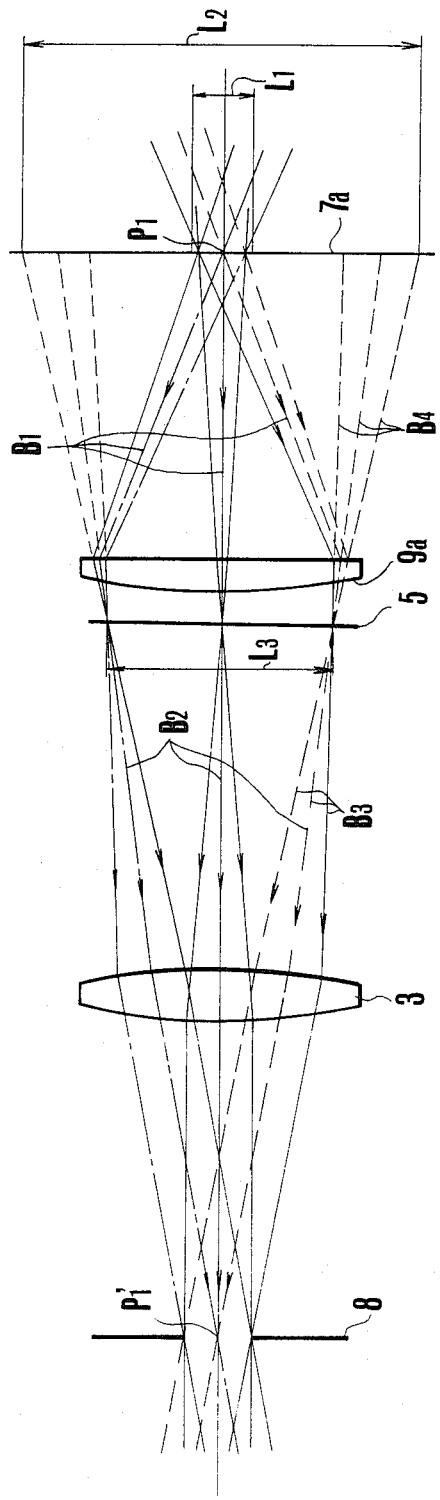

4,530,583

DISPLAY DEVICE FOR VIEW FINDER

This is a continuation of application Ser. No. 279,221, filed June 30, 1981, abandoned.

BACKGROUND OF THE INVENTION

1. Field of the Invention

The present invention relates to a camera view finder display device designed so that the display portion is evenly illuminated and thus easily observed.

2. Description of the Prior Art

Generally, the display device in the view finder in the camera consists of a display portion, a light leading body for illuminating the display portion, a light source and a part of the view finder optics. In most cases, the light leading body consists of a triangular prism having a reflecting surface and two permeable surfaces.

The display portion is arranged in the neighborhood of a permeable surface of the triangular prism or is made as one illumination prism body with the triangular prism disposed in the optical path of the view finder optics. Further, the light source is arranged in the neighborhood of the optical path of the view finder optics to illuminate the display portion by means of the light leading body. The display portion is observed through a part of the view finder optics.

It is necessary that the light source for the display device in the view finder be placed in a small space in the camera body. Thus, it is desired that the light source be as small as possible. However, in order to illuminate the display portion evenly in the conventional view finder device as mentioned above, a large light source having a large light emitting portion becomes necessary. On the other hand, it is difficult to illuminate the display portion evenly by means of a small light source having a small light emitting portion.

Consequently, when a small light source is used, a dispersing plate is needed in front of the light emitting portion to disperse the light beam. The use of a dispersing plate is generally undesirable because the brightness of the display portion is decreased.

The display device in the view field is disclosed for example, in U.S. Pat. No. 3,416,422, Japanese Patent Publication No. Sho 54-28736, Japanese Utility Model Publication No. Sho 45-29582, Japanese Utility Model Publication No. Sho 48-38183, etc.

SUMMARY OF THE INVENTION

An object of the present invention is to observe the evenly illuminated display portion in view finder without increasing the size of the light emitting portion of the light source. The principal feature is that the light leading body has a refracting characteristic so as to make the relation of the light emitting portion of the light source to the position of the pupil at the time of the observation an image in the view finder almost conjugate. The body is built in the optical path of the view finder optics so that the display portion is observed through a part of the view finder optics.

BRIEF DESCRIPTION OF THE DRAWINGS

FIG. 5 is a schematic view of a portion of the apparatus illustrated in FIG. 3.

DETAILED DESCRIPTION OF THE PREFERRED EMBODIMENTS

An embodiment of the present invention will be explained and compared with the conventional view finder.

Figure 1:
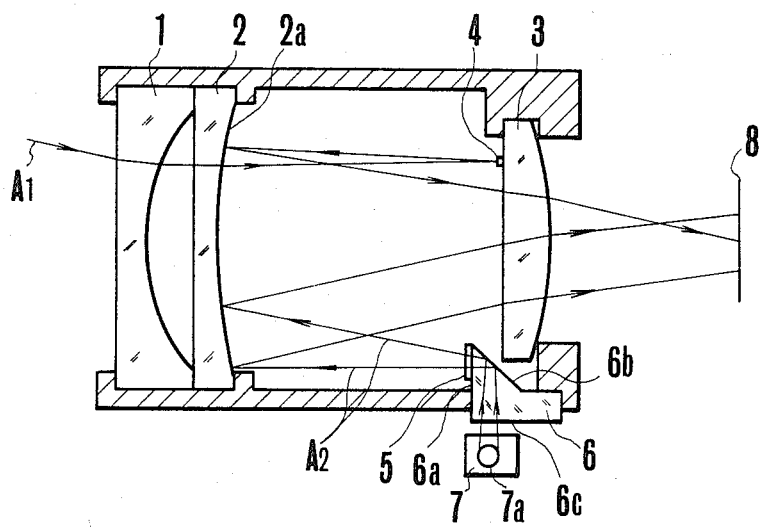
FIG. 1 is a schematic sectional view of an embodiment of the optics of the conventional display optics disposed in the view finder.

FIG. 1 shows an embodiment of the optics of the conventional display device in the view finder in section which includes: an objective lens 1, a concave lens 2 having a semi-permeable reflecting surface, a semi-permeable reflecting surface 2a, an eye piece 3, a reflective view field restriction frame 4 provided in the eye piece lens 3, a display portion 5 displayed in the view finder, an illumination prism 6, a light source 7, a light emitting portion 7a and a position of the pupil 8 at the time of the observation.

The objective lens 1, the concave lens 2 and the eye piece lens 3 constitute the view finder optics. The light source 7, the prism 6, the display portion 5, the semi-permeable reflecting surface 2a and the eye piece lens 3 constitute the optics of the display device in the view finder. A light beam A coming from the object (not shown), illuminates the view field restriction frame 4, and arrives at the position of the pupil 8.

In contrast, the light beam A2, emitted from the light emitting portion 7a, is incident upon the surface 6c of the prism 6, reflected by the reflecting surface 6b and then illuminates the display portion 5 disposed proximate to the surface 6a. The beam A2, which illuminates the display portion 5, is directed toward the position of the pupil 8 by means of the semi-permeable reflecting surface 2a and the eye piece lens 3.

Figure 2:
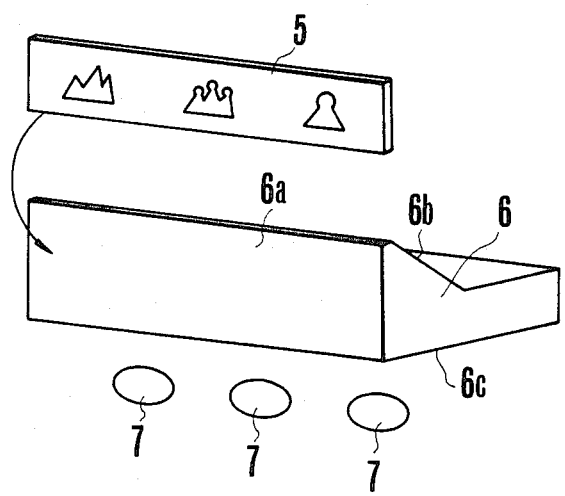
FIG. 2 is an enlarged scale of a portion of the apparatus illustrated in FIG. 1.

FIG. 2 shows the illumination prism 6 in FIG. 1 in an enlarged perspective view. The display portion 5 is arranged proximate to the surface 6a of the illumination prism 6. The portion 5 may be cemented on the surface 6a. The number of discrete displays in the display portion 5 and the light sources 7 may be one or more in accordance with the desired display form. The prism 6 is provided with a reflecting surface 6b and a light incident surface 6c.

In conventional devices of the general type, it is necessary to use a large light source having a large light emitting surface in order to illuminate the display portion S evenly. Such large light emitting surfaces cannot be built in the view finder of a camera body because of a lack of sufficient space.

Figure 3:
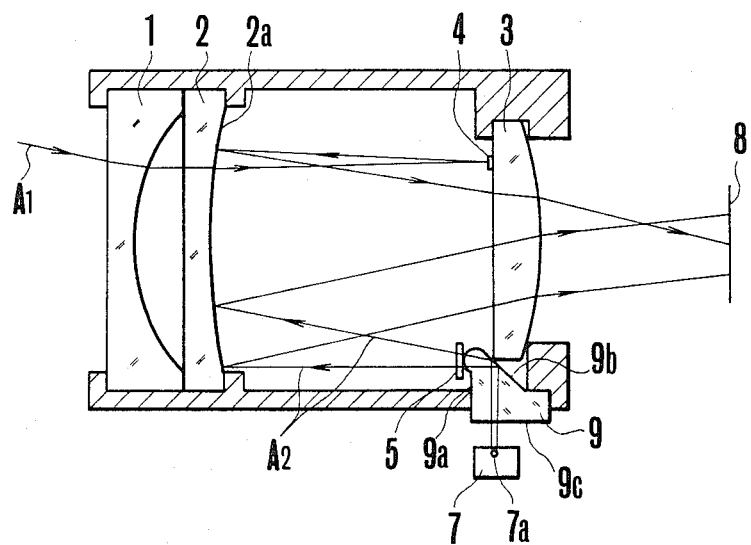
FIG. 3 is a sectional view of an embodiment of the optics of the display device in the view finder of the present invention.

FIG. 3 shows an embodiment of the present invention in section. The elements in FIG. 3 having the same reference numerals will be understood to be of substantially the same construction. In FIG. 3, the illumination prism lens 9 is shown instead of the illumination prism 6 shown in FIG. 1. At least one of the surfaces of the prism 9 has a refractive force in such a manner that the light emitting portion 7a and the position of the pupil 8 at the time of the observation are conjugated with each other. The prism 9 has a surface at which the light beam enters, a reflecting surface and a surface 9a at which the light beam passes out of the prism 9. In this embodiment, the surface 9a is a refractive surface.

Further, either the surface 9c may have the refractive characteristic or both of the surfaces 9a and 9c may have the refractive characteristic.

The light beam A2 emitted from the light source 7 reaches the surface 9c of the illumination prism lens 9 and is reflected on the surface 9b so as to illuminate the display portion proximate to the surface 9b. The display portion is observed at the position of the pupil 8 by means of the semi-permeable reflecting surface 2a and the eye piece lens 3. The observation method is the same as that for the conventional display device in the view finder shown in FIG. 1.

Figure 4:
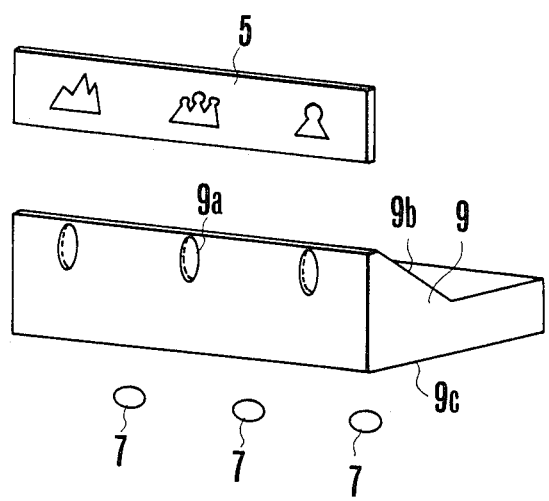
FIG. 4 is a perspective view, to an enlarged scale, of a portion of the apparatus illustrated in FIG. 3.

FIG. 4 shows an enlarged perspective view which is also shown in FIG. 3 of the illumination prism lens 9.

In the present embodiment, by making use of the permeable surface of the illumination prism lens 9 as the refracting surface, the display portion is illuminated evently with the light source having a small light emitting surface, so as to realize a compact light source 7.

The efficiency of the optics described herein in FIG. 3 will be apparent from the following description.

FIG. 5 shows the principal part shown in FIG. 3 in a developed view. The elements having the same reference numerals as those in FIG. 3 are substantially structurally the same. The structure includes a light emitting portion 7a of the light source, a refracting surface 9a provided on the surface at which light rays pass out of the illumination prism lens 9, a display portion 5, and a refracting portion consisting of the semi-permeable refracting surface 2a. The position of the pupil at the time of observation is indicated by the numeral 8.

In the drawing, the light emitting portion 7a is conjugated with the position of the pupil 8. The light beams B1 and B2 which have passed through the refracting surface 9a show that any point P1 of the light emitting portion 7a is conjugated with a point P1' at the position of the pupil 8. The light beam emitted from each point on the light emitting portion 7a is refracted at the refracting surface 9a to illuminate the whole surface of the display portion 5 and forms an image at the point 8. Consequently, if the diameter of the image of the light emitting surface 7a at the position of the pupil 8 is determined in advance, the whole light beam emitted from the light emitting surface 7a and illuminating the display portion 5 is incident upon the pupil so that the evenly illuminated display portion 5 can be observed at the position of the pupil 8. Further, by providing the refracting surface 9a, the whole surface of the display portion 5 can be evenly illuminated with the light emitting portion as large as L1.

On the other hand, in order that the same amount of the light beam is incident upon the position of the pupil without providing the refracting surface 9a, a light emitting portion as large as L2 is necessary. It will be understood that L2 corresponds to the prolongation of the light beam B3 up to the position of the light emitting portion in the reversed direction as is shown in dotted lines B4. Consequently, by providing the refracting surface 9a, a light emitting portion as large as L1 is sufficient, which enables the realization of a compact light source as compared with L2. The smaller source is convenient for a display device disposed in the view finder.

The prism having a refracting characteristic, as is shown in FIG. 4, generally consists of a plastic material, so that once a die is manufactured, mass production at low cost is possible.

What is claimed is:

1. A display device within a view finder of a camera, comprising:

an albada finder optics, having an objective lens and an eyepiece lens, with a semi-trasparent reflective film applied on the side of the objective lens opposite to the eyepiece lens;

a display portion provided between said objective lens and the eyepiece lens for making a display within a view finder field of vision;

an illumination light source provided outside of an effective light beam of said finder optics; and an illumination light leading body consisting of a prism having a light incident surface, a light emitting surface and a light reflecting surface, said light incident surface being flat and said light emitting surface having a converging refractive force, said illumination light leading body being arranged on the eyepiece lens side of the display portion with said light incident surface being opposed to the illumination light source and said light emitting surface being closely opposed to the display portion, so that the light beam from the illumination light source is incident on the light incident surface, reflected by the light reflecting surface and emitting through the light emitted surface to illuminate the display portion, and the light beam from the display portion is led to the objective lens, reflected by the semi-transparent reflective film and enters the eyepiece lens, said light emitting surface placing the illuminating light source and the pupil position in an optically conjugate relation.

* * * * *